(12) United States Patent
Wige et al.

(10) Patent No.: US 10,091,511 B2
(45) Date of Patent: Oct. 2, 2018

(54) EFFICIENT VIDEO BLOCK MATCHING

(71) Applicant: GetGo, Inc., Boston, MA (US)

(72) Inventors: Eugen Wige, Dresden (DE); Steffen Schulze, Dresden (DE); Sascha Kuemmel, Langebrueck (DE)

(73) Assignee: GetGo, Inc., Boston, MA (US)

( * ) Notice: Subject to any disclaimer, the term of this patent is extended or adjusted under 35 U.S.C. 154(b) by 172 days.

(21) Appl. No.: 14/589,099

(22) Filed: Jan. 5, 2015

(65) Prior Publication Data

US 2016/0198158 A1 Jul. 7, 2016

(51) Int. Cl.
*H04N 7/12* (2006.01)
*H04N 11/02* (2006.01)
*H04N 11/04* (2006.01)
*H04N 19/136* (2014.01)
*H04N 19/513* (2014.01)
*H04N 19/593* (2014.01)
*H04N 7/15* (2006.01)
*H04N 19/56* (2014.01)
(Continued)

(52) U.S. Cl.
CPC ............ *H04N 19/136* (2014.11); *H04N 7/15* (2013.01); *H04N 19/176* (2014.11); *H04N 19/503* (2014.11); *H04N 19/507* (2014.11); *H04N 19/51* (2014.11); *H04N 19/513* (2014.11); *H04N 19/533* (2014.11); *H04N 19/557* (2014.11); *H04N 19/56* (2014.11); *H04N 19/593* (2014.11); *H04N 19/61* (2014.11)

(58) Field of Classification Search
CPC .. H04N 19/136; H04N 19/513; H04N 19/593; H04N 7/15; H04N 19/56; H04N 19/507; H04N 19/176; H04N 19/51; H04N 19/61; H04N 19/533; H04N 19/557; H04N 19/503
See application file for complete search history.

(56) References Cited

U.S. PATENT DOCUMENTS 9,153,207 B2 * 10/2015 Shan .................. G09G 5/34
2005/0013369 A1 * 1/2005 Lee .................. H04N 19/56
375/240.16
(Continued)

FOREIGN PATENT DOCUMENTS

WO 2015058395 A1 4/2015

OTHER PUBLICATIONS

Lee et al., A Fast Hierarchical Motion-Compensation Scheme for Video Coding Using Block Feature Matching, IEEE Transactions on Circuits and Systems for Video Technology, vol. 6, No. 6, Dec. 1996.*

(Continued)

*Primary Examiner* — Jorge L Ortiz Criado
*Assistant Examiner* — Boubacar Abdou Tchoussou
(74) *Attorney, Agent, or Firm* — BainwoodHuang (57) ABSTRACT

A technique for encoding a video signal includes generating a representative value for each block of one or more video frames by applying a predetermined function to the pixels of the respective block. To perform a block matching operation for a current block, the technique applies the predetermined function to the current block and interrogates representative values of blocks at specified locations in a spatial and/or temporal vicinity of the current block to find a matching block whose representative value matches the one generated for the current block.

18 Claims, 6 Drawing Sheets

FIG. 10

(51) Int. Cl.
*H04N 19/503* (2014.01)
*H04N 19/176* (2014.01)
*H04N 19/51* (2014.01)
*H04N 19/61* (2014.01)
*H04N 19/533* (2014.01)
*H04N 19/557* (2014.01)
*H04N 19/507* (2014.01)

(56) References Cited

U.S. PATENT DOCUMENTS

| | | | |
|---|---|---|---|
| 2008/0170619 A1* | 7/2008 | Landau | H04N 21/23412 |
| | | | 375/240.16 |
| 2013/0117662 A1* | 5/2013 | Shan | G09G 5/34 |
| | | | 715/243 |
| 2014/0205009 A1* | 7/2014 | Rose | H04N 19/503 |
| | | | 375/240.12 |
| 2014/0369413 A1 | 12/2014 | Clark | |
| 2015/0208084 A1* | 7/2015 | Zhu | H04N 19/105 |
| | | | 375/240.02 |
| 2016/0234530 A1* | 8/2016 | Xu | H04N 19/503 |
| 2016/0241876 A1* | 8/2016 | Xu | H04N 1/4466 |
| 2016/0277733 A1* | 9/2016 | Li | H04N 19/593 |
| 2016/0277761 A1* | 9/2016 | Li | H04N 19/124 |

OTHER PUBLICATIONS

Li et al., A Unified Framework of Hash-based Matching for Screen Content Coding, IEEE VCIP'14, Dec. 7-Dec. 10, 2014, Valletta, Malta.*

"2-D Dictionary Based Video Coding for Screen Contents", (2014 Data Compression Conference), Zhu Weijia et al., IEEE Computer Society, Piscataway, NJ, Mar. 26, 2014, pp. 43-52.

International Search Report for PCT/US2015/061535 (Feb. 2016).

* cited by examiner

EFFICIENT VIDEO BLOCK MATCHING

BACKGROUND

Video conferencing, transmitting, and recording technologies commonly rely on video codecs for compressing and decompressing video signals. A conventional video codec includes both an encoder and a decoder. The encoder compresses video signals, and the decoder decompresses video signals. Codecs typically perform compression and decompression on "blocks" of video "frames," where each block is a square array of pixels, such as 8×8 pixels, 16×16 pixels, and so on, for example, and each frame corresponds to a still snapshot of a video signal. A "pixel" is the smallest addressable unit of a video frame and provides a sample (e.g., a collection of red, green, and blue values) of the video signal at the addressed location. As used herein, the term "blocks" refers to both on-grid blocks, i.e., block-sized arrays of pixels positioned on a regular block grid of a frame, and off-grid blocks, i.e., block-sized arrays of pixels positioned off of the regular grid. Well-known video codecs include those conforming to H.264 or H.265 standards.

Video codecs typically use predictions to achieve efficient compression. To encode a current block of raw pixels, for example, an encoder may search for a block-sized array of previously-processed pixels that matches, or comes close to matching, the current block. To this end, the encoder performs many block-matching operations. Each block-matching operation compares the current block with a block-sized array of previously-processed pixels. Block matching may be exact or approximate. For exact block matching, the encoder compares the current block, pixel-for-pixel, with previously-acquired arrays of raw pixels, and identifies a matching block as the block-sized array of raw pixels that exactly matches the current block. For approximate block matching, the encoder compares the current block with arrays of reconstructed pixels, i.e., produced by a local decoder that receives encoded blocks, and identifies a matching block as the array of reconstructed pixels that best fits the current block. In both cases, the encoder generates displacement vectors and/or motion vectors (e.g., for intra-frame and inter-frame prediction, respectively) that identify the spatial and/or temporal position of the matching block relative to the current block.

The encoder then identifies a prediction block. Prediction blocks are based on reconstructed pixels rather than on raw pixels, so that a remote decoder, which cannot access raw pixels, is able to generate the same prediction blocks as the encoder. In the case of exact block matching, the prediction block is the block-sized array of reconstructed pixels that the local decoder has generated from an encoded version of the matching block. In the case of approximate block matching, the prediction block is simply the matching block. The encoder then subtracts the prediction block, pixel-for-pixel, from the current block to yield a residual block, which thus represents an error in the prediction. Typically, the encoder then transforms, quantizes, and entropy encodes the residual block to produce an encoded block. The encoder may then store the encoded block or send it to a remote decoder, along with information about the prediction (e.g., a prediction mode and a displacement vector and/or motion vector), which enables the decoder to reverse the encoding process and reconstruct a rendition of the current block.

One prior technique for performing exact block matching using a hash table. The hash table associates hash values of blocks with corresponding block locations in video frames. To find a block that matches a current block, an encoder hashes the current block and looks up the resulting value in the hash table. The encoder iterates through the block locations listed in the hash table for the computed value and attempts to identify a best candidate for a matching block.

SUMMARY

Exact block matching that requires comparing blocks pixel-for-pixel can be resource-intensive and time-consuming. In real-time encoding scenarios, such as web conferencing and video chat, this time-consuming block-matching can result in missed opportunities to find matching blocks. For example, an encoder may need to abort its search for exactly matching blocks to keep pace with real-time encoding demands. Thus, one often has to settle for lower compression ratios and/or lower video quality than would be enjoyed if block matching could be done more efficiently. The above drawbacks of block matching are not only an issue for real-time encoding, as even offline encoding implementations proceed more slowly and consume more resources than would be needed if more efficient block exact matching were available.

Representing blocks in a hash table may improve the speed of exact block matching in some situations, but not in all. Indeed, exact block matching may proceed more slowly than pixel-for-pixel matching when encoding highly uniform content, such as screen-sharing content. In a screen-sharing scenario, computer software may generate graphical screen output having uniform areas with many identical pixel values. Hash tables constructed for such graphical output are often exceedingly deep, listing hundreds or even thousands or more locations of blocks whose pixel values all hash to the same hash value. For efficient encoding, it is generally not sufficient to pick just any of the hundreds, thousands, or more block locations listed in the table for a given hash value. Not just any block match will do. Rather, efficiency relies upon selecting particular blocks, e.g., those that best represent displayed objects. In the conventional, hash-table-based scheme, an encoder may have to check each of the hundreds, thousands, or more block locations listed for a particular hash value in order to find the one whose location best corresponds to that of the object in question. Such searching through the hash table can be time-consuming and results in poorer-than-optimal encoding performance.

In contrast with the above-described approaches, which can be resource-intensive and time-consuming, an improved technique for encoding a video signal generates a representative value for each block of one or more video frames by applying a predetermined function to the pixels of the respective block. To perform a block matching operation for a current block, the improved technique applies the predetermined function to the current block. The improved technique also interrogates representative values of blocks at specified locations in a spatial and/or temporal vicinity of the current block to find a matching block whose representative value matches the one generated for the current block.

The improved technique thus allows a video encoder to perform block matching without having to compare each individual pixel of the current block with a corresponding pixel of each candidate block. Rather, in some examples, the encoder can determine whether a candidate block matches the current block by making a single-value comparison. Also, because the improved technique checks for matching blocks at specified locations in the vicinity of the current block, lengthy searches through deep hash tables can be avoided. Block matching can thus proceed at higher speed and with more efficient use of resources than can generally be achieved with prior techniques, with resulting compressed video signals having higher compression ratios and/or higher quality.

Certain embodiments are directed to a method operable by electronic encoding circuitry for encoding video signals. The method includes generating a representative value for each of multiple blocks of a set of frames of a video signal, the representative value generated by applying a predetermined function to the pixels that make up the respective block and differing from representative values of particular other blocks that have different pixel values. The method further includes performing a block matching operation for a current block of the video signal by (i) applying the predetermined function to the pixels of the current block to generate a representative value for the current block, and (ii) interrogating representative values of a set of the blocks of the video signal at a set of specified locations in a spatial and/or temporal vicinity of the current block to identify a matching block having a representative value that matches that of the current block. The method still further includes sending, from the electronic encoding circuitry to a decoder, a pointer to a location of the matching block, the pointer providing input to the decoder in reconstructing the current block using content pointed-to by the pointer.

Other embodiments are directed to an apparatus for encoding video signals, the apparatus comprising electronic encoding circuitry constructed and arranged to perform a method of encoding video signals, such as described above. Still other embodiments are directed to a computer program product. The computer program product stores instructions which, when executed by electronic encoding circuitry, cause the electronic encoding circuitry to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for encoding a video signal generates a representative value for each block of one or more video frames by applying a predetermined function to the pixels of the respective block. To perform a block matching operation for a current block, the improved technique applies the predetermined function to the current block. The improved technique also interrogates representative values of blocks at specified locations in a spatial and/or temporal vicinity of the current block to find a matching block whose representative value matches the one generated for the current block.

Figure 1:
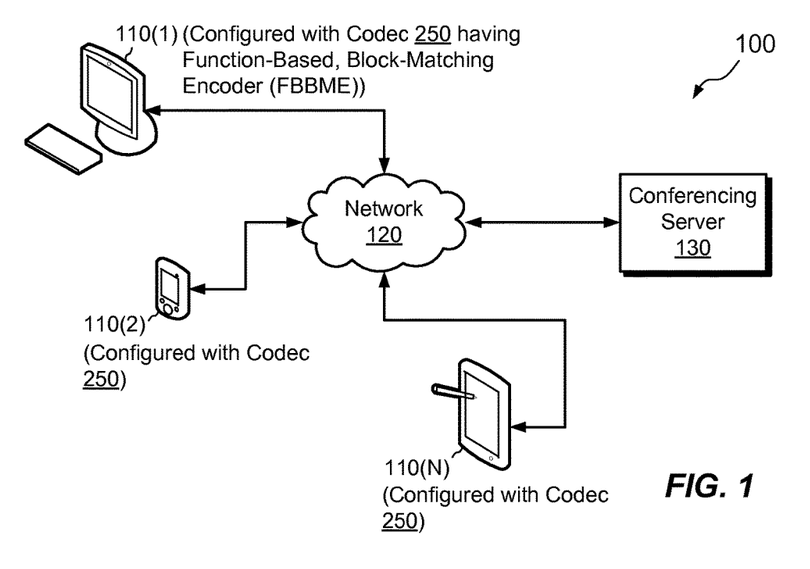
FIG. 1 is a block diagram of an example environment in which embodiments of the improved technique hereof can be practiced.

FIG. 1 shows an example environment 100 in which embodiments of the improved technique hereof can be practiced. Here, multiple client machines, shown as machines 110(1) through 110(N), connect to a network 120. In some examples, a web conferencing server 130 also connects to the network 120. Each of the machines 110(1) through 110(N) is configured with a codec 250 having a function-based, block-matching encoder (FBBME). The FBBME is capable of performing block matching by comparing a representative value of a current block with representative values of previously-processed blocks in the spatial and/or temporal vicinity of the current block, and thus avoids the need to perform time-consuming pixel-for-pixel comparisons.

In example operation, the machines 110(1) through 110(N) each have installed thereon a web conferencing application. Users of machines 110(1) through 110(N) may each run the web conferencing application on their respective machines to participate in a web conference, which may be orchestrated by the web conferencing server 130. As the web conference proceeds, users of the machines 110(1) through 110(N) can communicate using audio signals and may share live video of themselves and of their surroundings. By invoking features of the web conferencing application, users may also share their desktops or particular applications or documents, such that all conference participants are able to view the same screen content at the same time. Screen sharing can serve numerous useful purposes, such as to allow users to make presentations, to work collaboratively, or simply to share information.

Each of the machines 110(1) through 110(N) may employ its respective codec 250 to compress and/or decompress video content, including screen content. For example, a codec 250 running on any of the machines 110(1) through 110(N) obtains a video signal from a local camera (e.g., a webcam) and/or from locally originated screen content and encodes the obtained video signal. The originating machine transmits the encoded video signal, e.g., point-to-point or via the conferencing server 130, to receiving machines. Each receiving machine applies its respective codec to decode the video signal for viewing on a respective display.

By employing the codec 250 equipped with the FBBME, machines 110(1) to 110(N) can compress video data, and screen data in particular, more efficiently in real time than may be possible using conventional codecs, thereby producing compressed video signals that have higher compression ratios and/or higher quality.

It should be understood that the machines 110(1) through 110(N) can be provided in any number and in any suitable form or forms, such as using any of desktop computers, laptop computers, smartphones, tablets, PDAs (personal data assistants), televisions, set-top boxes, and so forth, which are capable of operating the codec 250 using software instructions executed by a set of processors and/or by using a specialized device or set of devices. Different ones of the machines 110(1) through 110(N) may be provided as different types of machines. In addition, the machines 110(1) through 110(N), or any of them individually, may be provided with external or otherwise separate codecs. Such codecs 250 may be implemented, for example, as self-contained devices, as separate modules, as integrated circuits, or as combinations of any of the above. Thus, the codec 250 with the FBBME may be implemented using any electronic circuitry, whether computerized or not.

The network 120 may be implemented using any type of network capable of conveying video data, such as a computer network (WAN, LAN, the Internet, etc.), a cable television network, a satellite network, a cell phone network, an over-the-air broadcast network, or any type of network or combination of networks.

Also, although the codec 250 with the FBBME is presented in connection with a web conferencing application, it should be understood that the use of the web conferencing application is merely an example. Thus, the codec 250 with the FBBME may be used in any situation that performs video compression.

Figure 2:
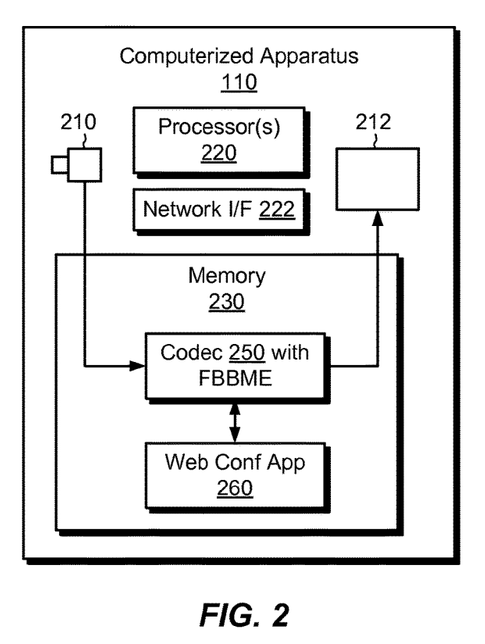
FIG. 2 is a block diagram of an example computerized apparatus of the type shown in FIG. 1.

FIG. 2 shows an example implementation of a computerized apparatus 110, and is intended to be typical of the machines 110(1) to 110(N). As indicated above, however, different ones of the machines 110(1) to 110(N) may be implemented differently. Thus, the example shown in FIG. 2 is merely illustrative.

Here, the computerized apparatus 110 is seen to include a camera 210, such as a built-in webcam or other camera, and a display 212, such as a computer monitor, screen, touchscreen, projector, television, etc. The computerized apparatus 110 is also seen to include a set of processors 220 (i.e., one or more processing chips and/or assemblies), a network interface 222, and memory 230. The memory 230 includes both volatile memory (e.g., RAM) and non-volatile memory, such as one or more disk drives, solid state drives, and the like. The set of processors 220 and the memory 230 together form control circuitry, which is constructed and arranged to carry out various methods and functions as described herein. Also, the memory 230 includes a variety of software constructs realized in the form of executable instructions. When the executable instructions are run by the set of processors 220, the set of processors 220 are caused to carry out the operations specified by the software constructs. Although certain software constructs are specifically shown and described, it is understood that the memory 230 typically includes many other software constructs, which are not shown, such as an operating system and various applications, processes, daemons, and so forth.

The memory 230 is seen to include instructions for realizing the above-described codec (250) and the web conferencing application (260). As shown, the codec 250 receives input from the camera 210, e.g., in a raw video format, and compresses the input for transmission to other machines 110 via the network interface 222. The codec 250 also receives compressed video signals via the network interface from other machines 110 and decompresses the received video signals. The computerized apparatus 110 may output decompressed video signals to the display 212, e.g., for presentation to a user.

In some examples, the web conferencing application 260 operates in coordination with the codec 250 to send and receive video signals. The video signals may include live cameral video as well as screen content of any displayed applications, windows, or desktops.

Figure 3:
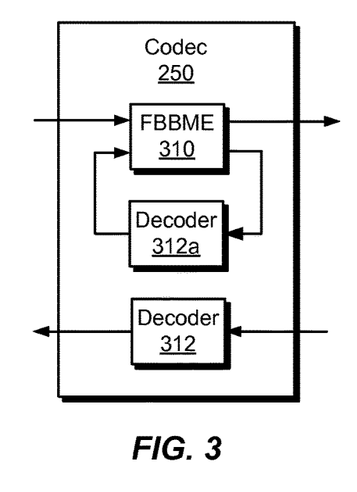
FIG. 3 is a block diagram of an example function-based, block-matching encoder (FBBME), which may be provided in the example computerized apparatus of the type shown in FIGS. 1 and 2.

FIG. 3 shows an example implementation of the codec 250 in additional detail. Here, it is seen that the codec 250 includes the above-described function-based block-matching encoder (FBBME; hereinafter, simply "encoder") 310, for compressing video signals, e.g., from the camera 210, from screen content, and/or from other sources, and a decoder 312, for decompressing video signals arriving from other machines or other compressed video sources. The codec 250 is also seen to include a decoder 312a. The decoder 312a is similar or identical to the decoder 312. The decoder 312a provides a replica of what a remote decoder would generate when decompressing video compressed by the encoder 310. In some examples, the encoder 310 receives output from the decoder 312a and applies the output to make predictions and/or to adjust the manner in which the encoder 310 performs compression. Just as the codec 250 may be implemented using electronic circuitry of any kind, whether computerized or not, so too can the encoder 310 and the decoders 312 and 312a each be implemented separately or together using electronic encoding circuitry and electronic decoding circuitry, respectively, whether computerized or not. Thus, the provision of the encoder 310 and decoders 312 and 312a within the computerized apparatus 110 should be regarded as merely illustrative.

In the example shown, the encoder 310 provides two outputs, a first output that carries entropy encoded video data, e.g., for transmission over the network 120, and a second output that carries video data without entropy encoding, for provision to the decoder 312a. In such examples, the decoder 312 includes entropy decoding circuitry for decoding entropy-encoded signals, whereas the decoder 312a does not.

Figure 4:
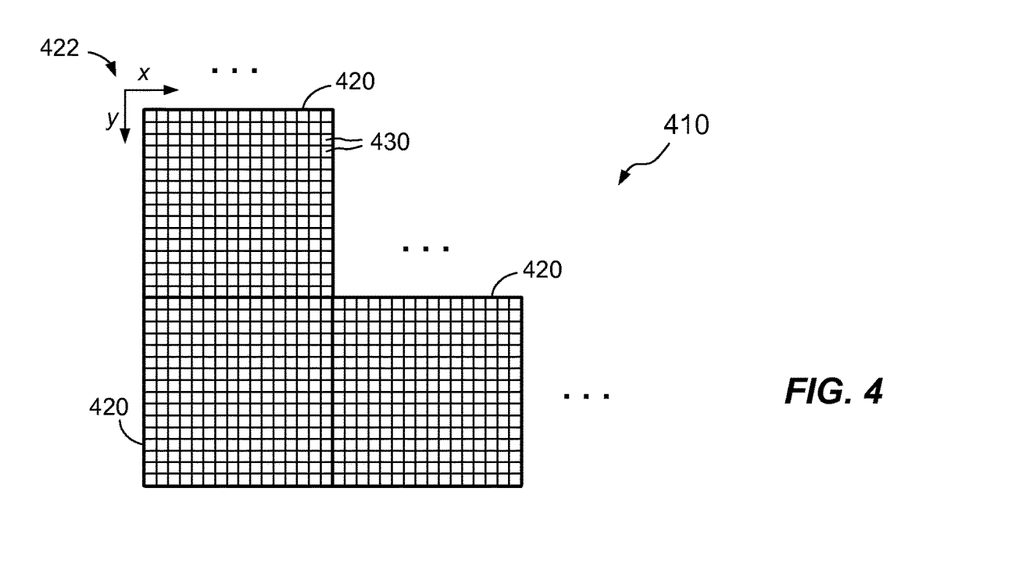
FIG. 4 is a diagram illustrating example blocks and pixels of a portion of a video signal.

FIG. 4 shows an example portion 410 of a video signal, which the encoder 310 may receive as input and/or which either of the decoders 312 or 312a may provide as output. The portion 410 of the video signal is seen to include multiple blocks 420 (three blocks 420 are shown). Each block 420 is a square array of pixels 430. For example, each of the blocks 420 is a 2-dimensional, 16×16 array of pixels 430. This is merely an example, however, as any block sizes may be used, such as 4×4, 8×8, 16×16, 32×32, and so forth. In an example, the portion 410 of the video signal is part of a frame of video that includes many blocks 420 arranged in a rectangular array.

In an example, positions of blocks 420 and pixels 430 are established on an x-y plane 422. For example, each block 420 and each pixel 430 in a current frame has x-y coordinates relative to an upper-left corner of the current frame. Each pixel 430 may also have x-y coordinates relative to an upper-left corner of the current block (i.e., pixels may be frame-referenced or block-referenced).

The pixels 430 themselves may be provided in a variety of formats. For example, the pixels 430 may be provided as binary pixels (e.g., black and white), as grayscale pixels, as color pixels, as composite color pixels, as pixels having luma and chroma values, as pixels having different color channels (e.g., red, green, and blue), or as pixels in other formats. The encoder 310 may receive such pixels, and the decoders 312 and 312a may output such pixels, in any of these formats, or in other formats, with minor and readily-discernable adjustments according to the particular pixel format used.

Figure 5:
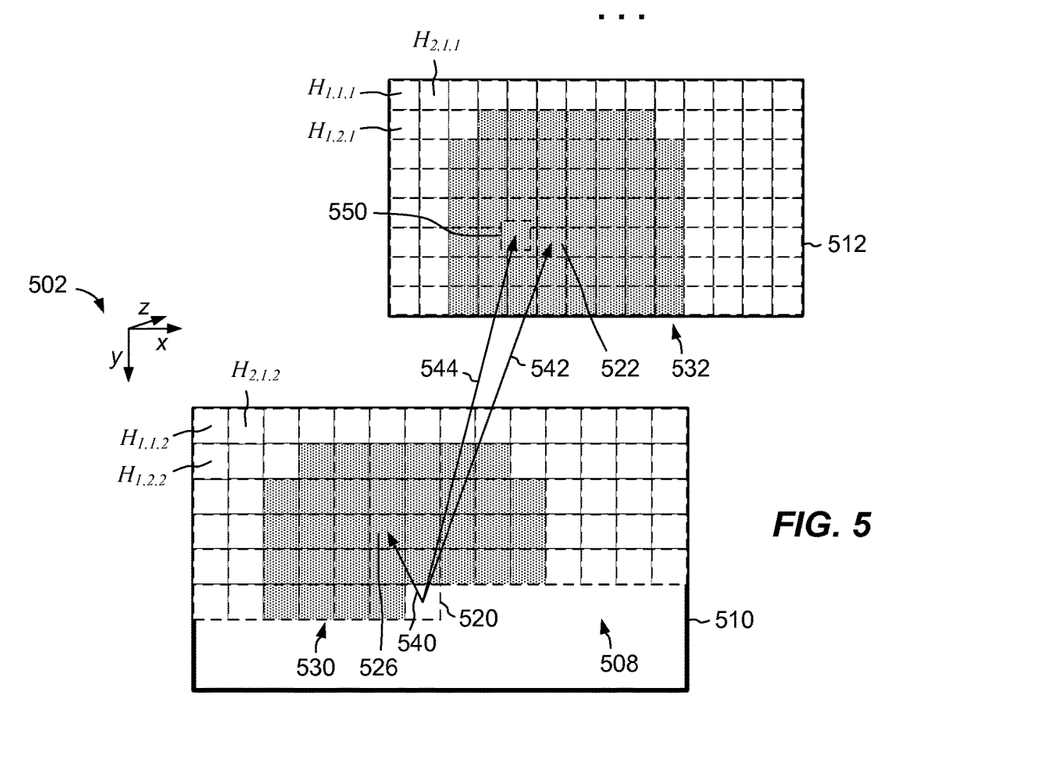
FIG. 5 is a diagram illustrating examples of block matching both within a frame and between frames of a video signal, as may be conducted by the FBBME of FIG. 3.

FIG. 5 shows an example arrangement for performing block matching by the encoder 310 through the use of representative values. The examples described in connection with FIG. 5 pertain to exact block matching. Exact block matching can be performed, for example, by comparing raw pixels in the current block with raw pixels in previously-processed blocks. Exact block matching can also be performed by comparing raw pixels in the current block with reconstructed pixels, i.e., pixels that have been encoded by the encoder 310 and subsequently decoded by the local decoder 312a. But exact block matching based on reconstructed pixels generally relies upon the pixels having been encoded losslessly. Otherwise, the encoding process will change pixel values such that exact block matches become rare.

Here, a current frame 510 of a video signal is seen to include multiple blocks 508 arranged in a block grid. Like the blocks 420 (FIG. 4), each of the blocks 508 includes a two-dimensional array of pixels (not visible in FIG. 5). FIG. 5 shows the current frame 510 in a course of being encoded, with a current block 520 currently being processed, many blocks (those shown, except 520) already having been processed, and other blocks (not shown) yet to be processed. Also shown in FIG. 5 is a previous frame 512, which includes blocks that the encoder 310 has already processed. The frames 510 and 512 are not intended to be drawn to scale. For example, typical frames generally include many more blocks than the number shown.

As the encoder 310 processes each of the blocks in the frames 510 and 512, or at some other suitable time, the encoder 310 applies a predetermined function to generate a representative value (e.g., $H_{1,1,2}$, $H_{1,2,2}$, $H_{2,1,2}$, etc.) for each of the respective blocks. In an example, each representative value is a single value that accounts for both pixel values (e.g., colors, grayscale values, etc.) and relative pixel locations (e.g., x-y coordinates) of pixels within the respective block. Thus, the encoder 310 typically generates different representative values for blocks having different pixel values and/or relative locations, while the encoder 310 generates the same representative values for blocks having identical pixel values in corresponding locations.

In an example, the encoder 310 stores representative values in a data structure that is arranged according to block coordinates and frame number. For example, the encoder 310 may store representative values for blocks in a three-dimensional array indexed by x coordinate, y coordinate, and z coordinate (frame—see legend 502). As the x-y coordinates of any block may cover a region of x-y space, the block's x-y coordinates may be taken to be the x-y coordinates of any suitable pixel within that block. By convention, the x-y coordinates of a block may be taken as the coordinates of the block's upper-left pixel. The encoder 310 can thus apply the generated representative values, $H_{x,y,z}$, when performing block matching, as blocks having the same pixel values at the same locations result in the same representative values, whereas blocks having different pixel values and/or locations result in different representative values.

The current frame 510 is seen to include a number of blocks 530 (shaded) in the spatial vicinity of the current block 520. In an example, the encoder 310 attempts to perform a block matching operation for the current block 520, e.g. in an effort to use intra-frame prediction to encode the current block 520 efficiently. The encoder 310 applies the predetermined function to the pixels of the current block 520 to produce a single value, $H_{x,y,z}$. In an example, the encoder 310 specifies the locations of the blocks 530 in the vicinity of the current block and interrogates the representative values, $H_{x,y,z}$, at the specified locations. For example, the encoder 310 interrogates the above-described data structure at the indices corresponding to the x-y coordinates of each of the blocks 530 for the current frame.

If the encoder 310 finds a block having the same representative value as the current block 520, the encoder 310 may identify that block as a matching block. The encoder 310 may then generate a pointer that points to the location of the matching block and provide the pointer as output. In one of the examples shown, the encoder identifies block 526 as the matching block and provides the pointer 540 to the matching block 526 as output.

When a decoder 312 (e.g., on another machine 110) receives the pointer 540, the decoder 312 accesses a reconstruction of the current frame 510, which the decoder 312 is in the process of assembling, and uses the reconstructed pixels at the location pointed-to by the pointer 540 in generating pixels for the current block. For example, the decoder 312 may simply copy the pixels from the pointed-to location to the location where the current block is being assembled. More typically, however, the decoder 312 receives a residual block from the encoder 310, in addition to receiving the pointer 540. The residual block provides a difference, computed by the encoder 310, between the current block and a prediction, where the prediction is formed from reconstructed pixels (generated by the local decoder 312a) at the location pointed-to by the pointer 540. The decoder 312 then uses its own reconstructed pixels at the pointed-to location as a local prediction, and adds, pixel-by-pixel, the local prediction to the residual block. The result provides a reconstruction of the current block. In a like manner, the decoder 312a may also receive the pointer 540 and apply the pointer 540 in as described above, for assembling a local reconstruction of the current block.

The encoder 310 may also look to previously-processed frames, such as the frame 512, to find a matching block for performing inter-frame prediction. For previous frames, the encoder 310 may already have generated representative values (e.g., $H_{1,1,1}$, $H_{1,2,1}$, $H_{2,1,1}$, etc.) for constituent blocks. In an example, the encoder 310 specifies a set of blocks 532 (shaded) in the frame 512 in both the spatial and temporal vicinity of the current block 520. In an example, the encoder 310 establishes the spatial vicinity of the current block 420 based on an x-y distance from the coordinates the current block 520 and establishes the temporal vicinity based on a time between frames. Here, it is assumed that the frames 510 and 512 are consecutive and thus occur closely in time. In some examples, the encoder 310 retains a record of recent frames, which include blocks that are candidates for matching blocks. The encoder 310 may discard less recentlyprocessed frames from the record and ignore them when searching for matching blocks.

To identify a matching block in the previous frame 512, the encoder 310 compares the representative value of the current block 520 with values, $H_{x,y,z}$, of the blocks 532. A match between representative values indicates a matching block. A matching block among the blocks 532 in the spatial and temporal vicinity of the current block 520 is highly suggestive of the same portion of the same object shown in both frame 510 and frame 512.

In one example shown, the encoder 310 finds a matching block 522, in the previous frame 512, at the exact same location (x-y coordinates) as the current block 520. This match is suggestive of an object that has not moved between frames. The encoder 310 generates a pointer 542 to the matching block 522. The pointer 542 points to the same x-y coordinates as the current block 520, but has a different z-coordinate, indicating a different frame. The encoder 310 provides the pointer 542 as output, where it is available to the decoders 312 and 312a for performing inter-frame prediction. In the context of inter-frame prediction, the pointer 542 may be regarded as a "motion vector," as it encodes motion of a portion of an object (here, the motion is zero). The decoders 312 and 312a receive the motion vector and access a local reconstruction of the frame 512. The decoders 312 and 312a use the pixels at the pointed-to location in generating pixels (or predictions of pixels) for the current block 540, much as described above in the intra-frame prediction example.

In another example shown, the encoder 310 fails to find a matching block anywhere amongst the blocks 532. Rather than aborting its search, the encoder 310 proceeds to interrogate off-grid blocks, i.e., block-sized arrays of pixels that are not circumscribed by the block grid. In an example, the encoder 310 generates representative values for off-grid blocks within the region circumscribed by the blocks 532. Off-grid blocks are not constrained to any grid and may be offset from the grid by any number of pixels in any direction. As there are many more off-grid blocks than there are on-grid blocks, the encoder 310 preferably waits to generate representative values for off-grid blocks until it has attempted to find a matching block from among the on-grid blocks and has failed. Further, the encoder 310 may prioritize its generation of representative values for off-grid blocks, to begin close to an expected location of the matching block (e.g., close to the coordinates of the current block 520) and to compare each newly generated representative value against that of the current block 520 as it proceeds. The encoder 310 may stop generating representative values for off-grid blocks once it finds a matching off-grid block. In the example shown, the encoder 310 finds a matching off-grid block 550 and generates a pointer 544 that points to the matching block. For example, the pointer 544 points to the x-y coordinates of the upper-left pixel of the matching block 550 in the frame 512. The encoder 310 outputs the pointer 544 (also a motion vector), which the decoders 312 and 312a can apply in reconstructing the current block 520. It should be understood that the encoder 310 may perform both on-grid block matching and off-grid block matching when performing both inter-frame prediction and intra-frame prediction.

In some examples, the predetermined function used by the encoder 310 generates representative values that are unique, meaning that no two blocks that differ in any way can possibly have the same representative value. In other examples, absolute uniqueness is not guaranteed. For example, the encoder 310 may provide the representative values with too few bits to uniquely represent all possible combinations of pixel values across all pixel locations within a block. In some examples, the encoder 310 addresses this lack of uniqueness by verifying block matches. For example, if the encoder 310 establishes a block match by determining that the representative value of the current block 520 matches that of a candidate block, the encoder 310 may proceed to compare, pixel-for-pixel, each pixel of the current block with the corresponding pixel of the candidate block. Only if all the pixels are the same does the encoder 310 confirm the match. If all of the pixels do not match, the encoder 310 may disregard the match and continue searching. It should be understood that performing pixel-for-pixel comparisons on matching blocks comes at little cost to encoding efficiency, as it is performed only for matching blocks rather than for all candidate blocks, as is done in many conventional approaches.

Further, in some examples the encoder 310 identifies blocks in the spatial and/or temporal vicinity of the current block (e.g., 530, 532) using a variety of information. For example, the encoder 310 may consider motion vectors of blocks from previously processed frames, and/or may consider displacement vectors of neighboring blocks in the same frame, to predict positions of matching blocks. The encoder 310 may then bias the positions of the blocks 530 and/or 532 accordingly. Also, the encoder 310 may take into account user actions. For instance, when the encoder 310 is provided in a computerized apparatus 110 running a web conferencing application 160 that supports screen sharing, the encoder 310 may receive input from the web conferencing application 160 that indicates a user action to scroll, pan, or otherwise move screen content shared through the conferencing application 160. The encoder 310 responds to the input by biasing the positions of the blocks 530 and/or 532 accordingly.

Also, although the above-described block matching schemes for intra-frame and inter-frame prediction have been described separately, it should be understood that these predictions may be performed together. For example, the encoder 310 may search for both intra-frame and inter-frame block matches in parallel, essentially at the same time.

Figure 6:
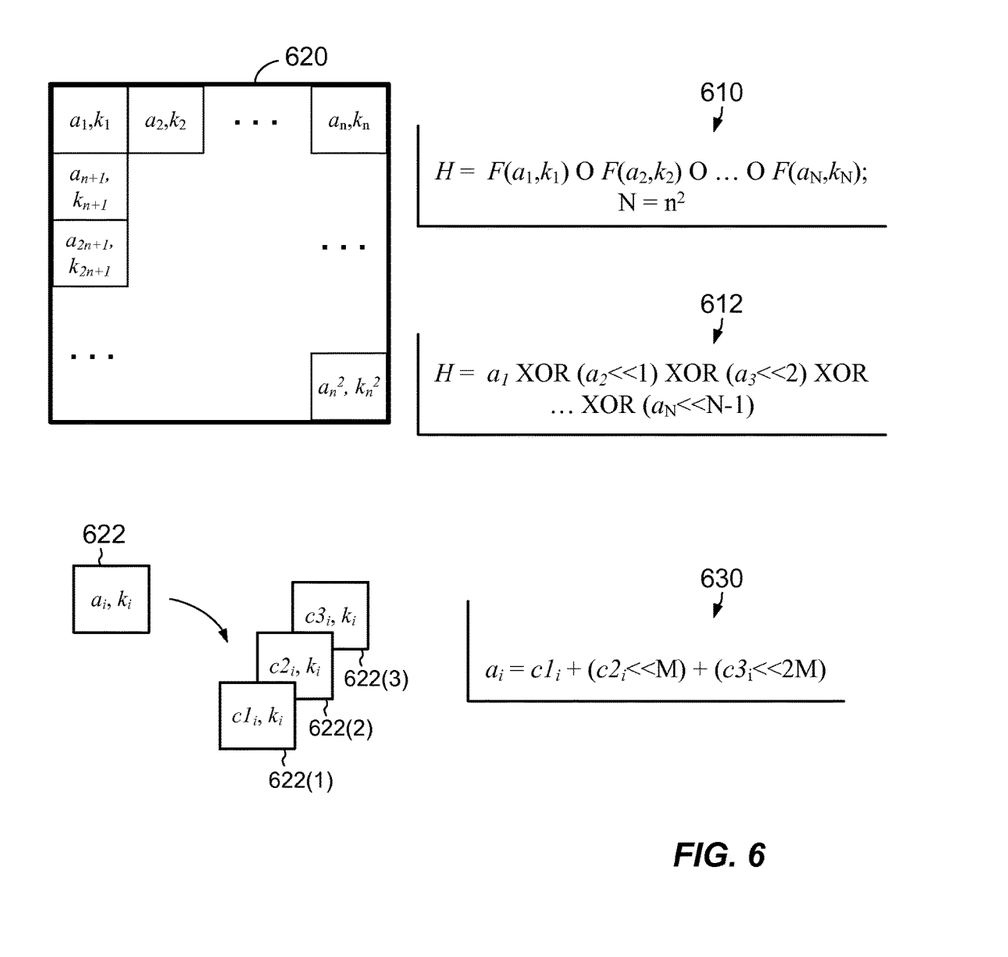
FIG. 6 is a diagram illustrating a block of a video signal and example methods for generating a representative value for the block that takes into account both pixel values and pixel positions.

FIG. 6 shows example arrangements for generating representative values for a block from the block's pixel values and locations. Here, a current block 620 is seen to include multiple pixels, where each pixel has a value $a_i$ and a position $k_i$. In various examples, the value $a_i$ of a pixel is its grayscale value, the value of any of its color channels (assuming it has color channels), any combination of colors from its color channels, and so forth. The position $k_i$ is the relative position of the pixel within the block 620, such as the pixel's ordinal location relative to the upper-left corner of the block 620, counting row-wise from top to bottom. In this example, the block 620 is an n×n block, having a total of $N=n^2$ pixels.

In an example, the encoder 310 generates a representative value, "H," by applying a predetermined function to the pixels of the block 620 in accordance with equation 610. The predetermined function has the form $$H=F(a_1,k_1)OF(a_2,k_2)O \ldots OF(a_N,k_N),$$

where, "F" is a sub-function that modifies each pixel value depending on its pixel location within the block 620 and "O" is an operator for combining intermediate values.

A particular example of equation 610 is shown with equation 612, where the predetermined function has the form $$H = a_1 \text{XOR}(a_2 \ll 1) \text{XOR}(a_3 \ll 2) \text{XOR} \ldots \text{XOR}(a_N \ll N-1),$$

where "<<" indicates a left bit shift. Thus, for example, the representative value is generated as the value of the first pixel, $a_1$, exclusive-OR'd (XOR'd) with the value of the second pixel, $a_2$, shifted one bit to the left. Additional pixel values are XOR'd in the manner shown, with each pixel value being bit-shifted one more location to the left than the preceding pixel value, until all pixel values are included.

The equation 612 may be regarded as a hash function, and the representative value, H, may be regarded as a hash value. However, this is merely an example, as the predetermined function need not be a hash function and the representative value need not be a hash value. For example, one could realize a predetermined function as a simple concatenation of pixel values ordered according pixel positions within the block 620. Resulting representative values would be lengthy and difficult to manage, however (even if compressed), making a hash function a better choice for many applications.

In some examples, as shown at the bottom of FIG. 6, a given pixel 622 in the block 620 may have three distinct color values 622(1), 622(2), and 622(3), representing, for example, M-bit values each for red, green, and blue, or, more generally, for colors c1, c2, and c3. In an example, the encoder 310 combines the colors according to equation 630, where $$a_i = c1_i + (c2_i \ll M) + (c3_i \ll 2M).$$

In an example, M=8, indicating 8-bit color values, such that the value $a_i$ of the pixel 622 is simply the first color, c1, OR'd with second color, c2, bit shifted 8 bits to the left, OR'd with the third color, c3, bit shifted 16 bits to the left.

Some implementations may not require all color values to be included in the computed pixel value, $a_i$. For example, the encoder 310 may generate representative values having adequate uniqueness by using two colors, or even a single color.

It should be understood that the particular forms of equations 610, 612, and 630 are intended to provide illustrative examples for generating the representative values, H, and that the invention hereof is not limited to the use of any of these equations.

Figure 7:
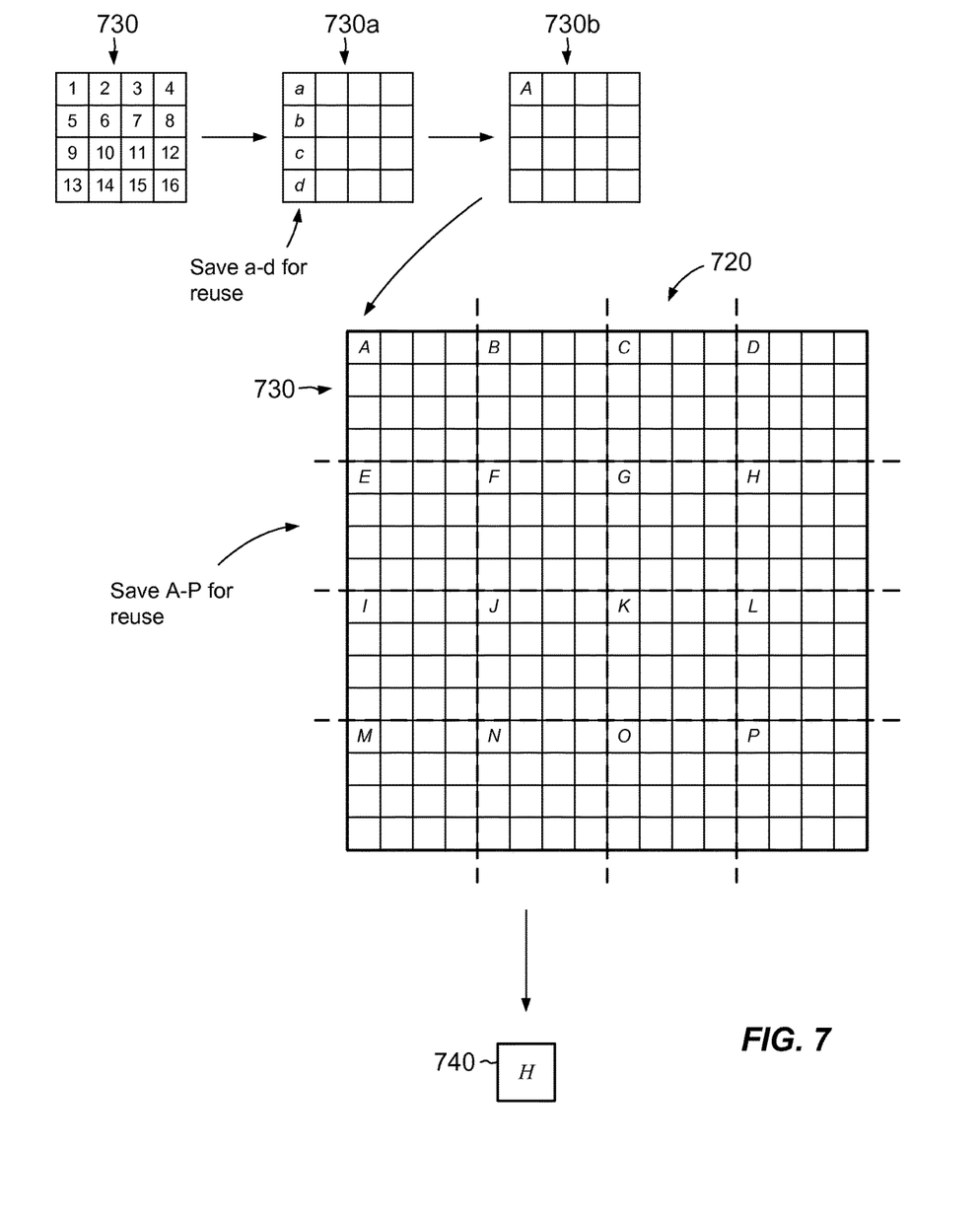
FIG. 7 is a diagram illustrating an example method for generating a representative value for a block using an example separable processing technique.

FIG. 7 shows an example optimization for generating representative values, H, using a separable processing approach. Here, a block 720 is shown as a 16×16 array of pixels. Computing a representative value, H, all at once for a block this size may be inefficient. According to the separable approach, this large, inefficient processing task is transformed into multiple smaller, more efficient processing tasks.

In the example shown, the encoder 310 represents the 16×16 block 720 as 16 4×4 regions, including an upper-left 4×4 region 730. Taking this 4×4 region 730 as an example, the encoder 310 performs a first processing step whereby it operates the predetermined function (e.g., the function 610 or its more specific version 612—see FIG. 6) once for each row of the region 730. For example, the encoder 310 operates the equation 612 on the pixels labeled 1, 2, 3, and 4 to generate a single row value, a, which represents an intermediate "H-value" for the top row of region 730. The encoder 310 also operates the equation 612 on the second row of pixels (5, 6, 7, and 8), operates the equation 612 on the third row of pixels (9, 10, 11, and 12), and operates the equation 612 on the fourth row of pixels (13, 14, 15, and 16), to generate single row values b, c, and d, respectively. The encoder 310 then expresses the rows of the 4×4 block 730 with the row values, a, b, c, and d, which the encoder 310 assigns by convention to the first position in each row (see 730a). The encoder 310 then performs a second processing step whereby it operates equation 612, for example, on all four row values, a, b, c, and d, to produce a value, A, which provides a single region value for the entire 4×4 region 730. By convention, the encoder 310 assigns the single region value A to the top-left position (see 730a). The encoder 310 performs the processing described above for each of the 4×4 regions of the block 720, to generate a single region value for each 4×4 region, shown as single region values A-P. It can thus be seen that the single region values A-P themselves form a 4×4 array of values.

Next, the encoder 310 processes the 4×4 array of single region values A-P to generate an overall H-value 740, which provides the representative value for the block 720. Processing the 4×4 array of single region values A-P proceeds in a manner similar to that described above for the 4×4 region 730, except that, instead of the encoder 310 processing pixel values 1-16 directly, the encoder 310 processes intermediate values A-P. For example, the encoder 310 first processes each row, e.g., by applying equation 612 to the single region values in each row, to generate single row values, i.e., one value for A-D, one value for E-H, one value for I-L, and one value for M-P. The encoder 310 then applies equation 612 to all four resulting row values to generate the H-value 740.

The above-described separable approach for generating representative values can be used for blocks of various sizes, such as 8×8, 16×16, 32×32, and so forth. Also, although the described processing operates on 4×4 arrays of values, it can also operate on other-sized arrays, such as 2×2, 8×8, and so on. In some examples, processing operates on different-sized arrays at different levels. For instance, the encoder 310 may use 4×4 arrays of pixels for a first level of processing, but may use 2×2 arrays of intermediate values at a second level.

Also, although the separable approach has been described as, first, generating single row values and, second, generating overall values, the direction of processing can be transposed, such that the separable approach, first, generates single column values representing all elements in a column and, second, generates overall values based on all of the column values.

In some examples, the encoder 310 temporarily saves the single-row values (e.g., a, b, c, d, and higher-level row values) and the single region values (e.g., A-P) for use in generating representative values for overlapping blocks (e.g., off-grid blocks). For example, to generate the representative value for an off-grid block located one pixel position down from the block 720, the encoder 310 may reuse all except one row's worth of single row values generated for the 4×4 pixel regions. Similarly, to generate the representative value for an off-grid block located four pixel positions down from the block 720, the encoder 310 may reuse all except one row's worth of single region values (e.g., values E-P may be reused). Similar efficiencies may be gained for processing blocks offset horizontally or diagonally. It can thus be seen that the separable approach is efficient not only for generating the representative value of a single block, but also for generating representative values of overlapping blocks.

Figure 8:
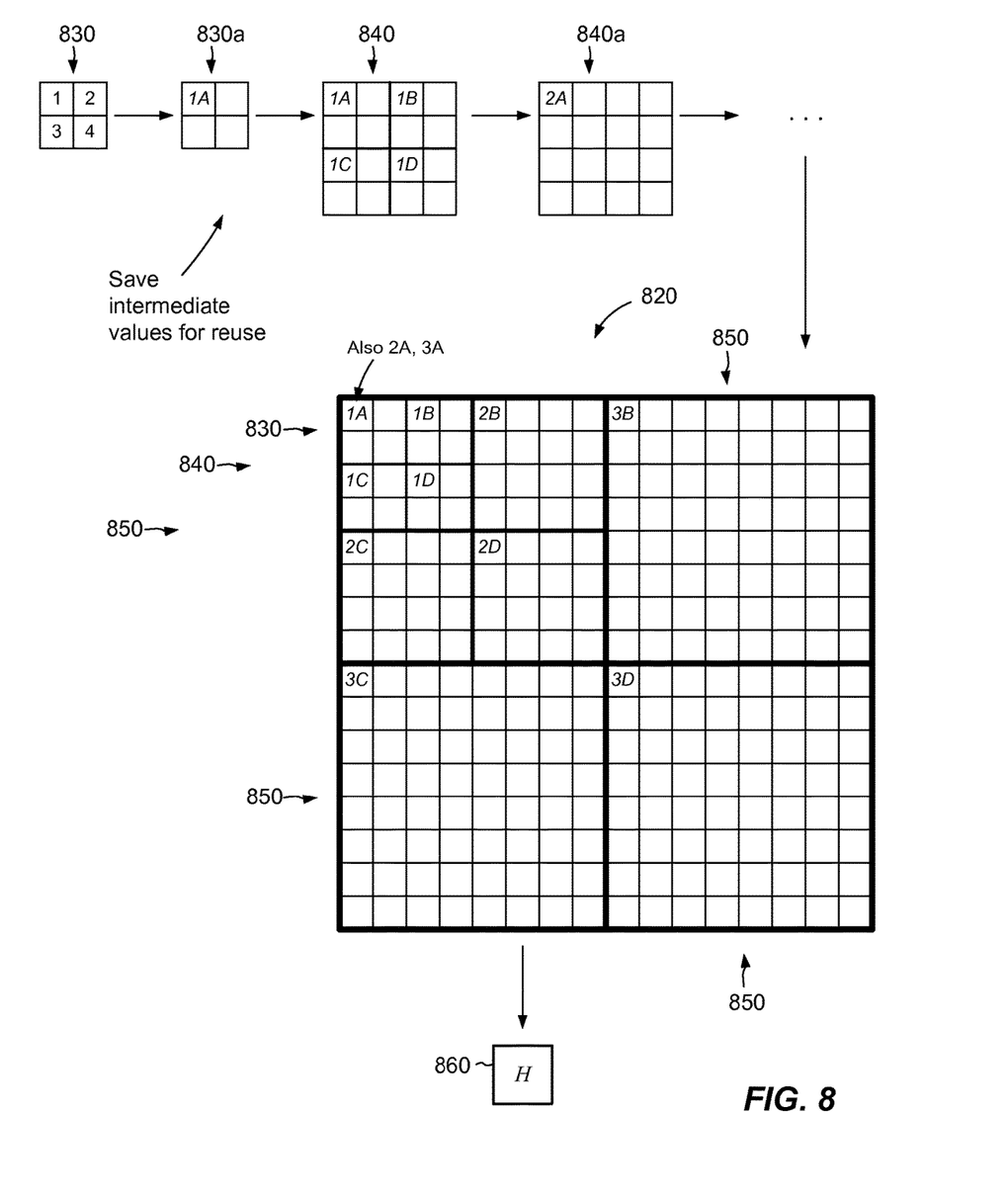
FIG. 8 is a diagram illustrating an example method for generating a representative value for a block using an example dyadic processing technique.

FIG. 8 shows another example optimization for generating representative values, H, here using a dyadic processing approach. The encoder 310 may employ the dyadic approach as an alternative to the separable approach (FIG. 7), or in addition to the separable approach, e.g., as part of a hybrid approach.

Here, a block 820 is shown as a 16×16 array of pixels. It can be seen that the block 820 can be divided into four contiguous and non-overlapping 8×8 regions 850. Each 8×8 region 850 can be subdivided into four contiguous and non-overlapping 4×4 regions 840, and each 4×4 region can be subdivided into four contiguous and non-overlapping 2×2 regions 830.

In an example, to generate a representative value for the block 820, the encoder 310 first generates a first-level dyadic result for each of the 2×2 regions 830. With reference to the top of FIG. 8, the encoder 310 applies equation 612, for example, to pixel values 1, 2, 3, and 4 in a 2×2 region 830 to generate a first level dyadic result 1A (see 830a). By convention, the encoder 310 locates the first level dyadic result in the upper-left pixel location of the region 830. The encoder 310 performs similar operations to generate first-level dyadic results for each of the other 2×2 regions 830 in the block 820.

The encoder 310 then proceeds to generate second-level dyadic results for each 4×4 region 840. With further reference to the top of FIG. 8, it can be seen that the upper-left 4×4 region 840 includes four first-level dyadic results, 1A, 1B, 1C, and 1D. The encoder 310 applies equation 612, for example, to these first-level dyadic results to generate a second-level dyadic result 2A (see 840a). The encoder 310 performs similar operations to generate second-level dyadic results for each of the other 4×4 regions 840 in the block 820.

The encoder 310 then proceeds to generate third-level dyadic results for each 8×8 region 850. With reference to the middle of FIG. 8, it can be seen that the upper-left 8×8 region 850 includes four second-level dyadic results, 2A, 2B, 2C, and 2D. The encoder 310 applies equation 612, for example, to these second-level dyadic results to generate a third-level dyadic result 3A. The encoder 310 performs similar operations to generate third-level dyadic results for each of the other 8×8 regions 850 in the block 820.

Finally, the encoder 310 proceeds to generate an overall result for the block 820. The block 820 can be seen to include four third-level dyadic results, 3A, 3B, 3C, and 3D. The encoder 310 applies equation 612, for example, to these third-level dyadic results to generate an overall dyadic result 860, which provides the representative value, H, for the block 820.

As with the separable approach, the encoder 310 can operate the dyadic approach with blocks of various sizes, such as 8×8, 16×16, 32×32, and so forth. Also, the encoder 310 can operate the dyadic approach with different-sized arrays of values at a time, such as 4×4 arrays, 8×8 arrays, and so forth. For example, increasing the base array size from 2×2 (as shown) to 4×4 reduces the number of processing levels from four to two but also increases the complexity of processing at each level. In some examples, the dyadic approach may process some portions of a block with arrays of one size (e.g., 2×2) and other portions with arrays of another size (e.g., 4×4). Further, the dyadic approach may process some levels of a block, or a portion thereof, with arrays of one size and other levels with arrays of another size.

The encoder 310 may mix dyadic processing with separable processing in a hybrid approach. For example, the encoder 310 may process the 8×8 regions in the block 820 using the dyadic approach, but may combine the 8×8 regions using the separable approach. Many variations are contemplated.

In some examples, the dyadic approach saves intermediate results at each level for reuse by the encoder 310 in computing representative values for overlapping blocks.

Figure 9:
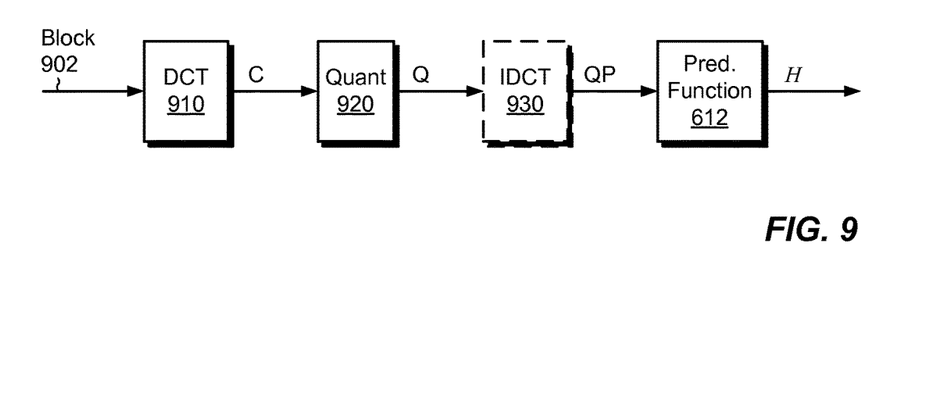
FIG. 9 is a block diagram showing an example alternative arrangement for generating a representative value for a block after removing information from the block, thus allowing block matches to be established for blocks that are only approximate matches.

FIG. 9 shows an example arrangement for generating representative values for blocks in a manner that allows for approximate block matching. Although exact block matching promotes efficiency when encoding screen-sharing and other synthetic content, exact block matching is often less efficient when encoding natural content, as exact matches in natural content rarely occur.

Here, the encoder 310 generates a representative value, H, for a block 902, by subjecting the block 902 to DCT (Discrete Cosine Transform) operator 910 and to a quantizer 920, before applying a predetermined function, such as the function 612. The DCT operator 910 transforms an n×n block of pixels into a corresponding n×n array of DCT coefficients, C. The quantizer 920 applies rounding, truncation, and/or other modifications to the DCT coefficients, to produce an n×n array of quantized DCT coefficients, Q. Optionally, the encoder 310 subjects the quantized DCT coefficients to an inverse-DCT operator (IDCT) 930, to transform the quantized DCT coefficients back to pixel values, QP, prior to applying the predetermined function 612. The predetermined function 612 then operates on the quantized coefficients, Q, or on the pixels, QP, to generate the representative value, H, for the block 902. As the quantized DCT coefficients, Q, carry the same information content about the pixel values and positions as the regenerated pixels, QP, there is generally little or no benefit to including the IDCT operator 930. Operating the predetermined function 612 on the quantized DCT coefficients accounts for both coefficient values and positions in the same way that it accounts for pixel values and positions when operating on a block.

Generating representative values using the arrangement of FIG. 9 allows blocks that are similar but not identical to produce block matches. Thus, the arrangement of FIG. 9 promotes encoding efficiency when used on natural video content. It should be understood that the encoder 310 may perform approximate block matching as described in connection with FIG. 9 alongside performing exact block matching. For example, the encoder 310 may use both approximate and exact block matching to promote efficiency for encoding both natural and synthetic content. Although the above-described arrangement for approximate block matching employs the DCT, it should be understood that other two-dimensional frequency transforms or integer transforms may alternatively be used. Therefore, the use of the DCT (and of the IDCT) in this context is merely illustrative.

Figure 10:
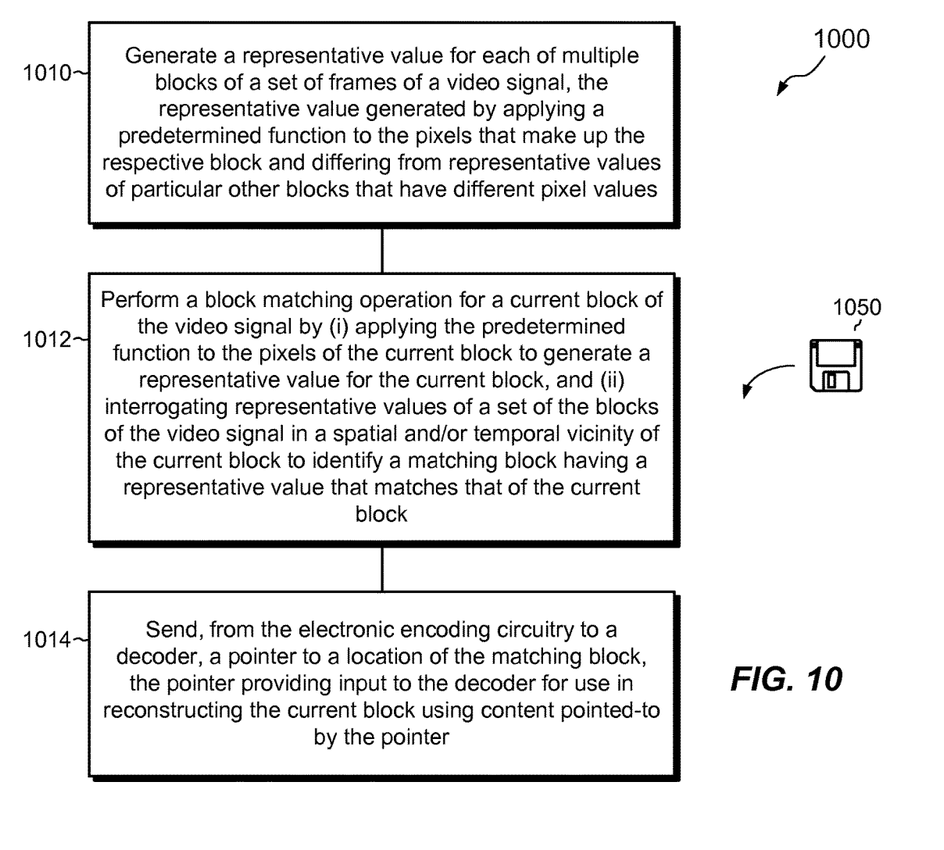
FIG. 10 is a flowchart showing an example process for encoding video signals using function-based block matching.

FIG. 10 shows a process 1000 that may be carried out in connection with the environment 100 and provides a summary of much of the above-described subject matter. The process 1000 is typically performed by the software constructs, described in connection with FIGS. 1-3, which reside in the memory 230 of the computerized apparatus 110 and are run by the set of processors 220. The various acts of the process 1000 may be ordered in any suitable way. Accordingly, embodiments may be constructed in which acts are performed in orders different from those illustrated, which may include performing some acts simultaneously, even though the acts are shown as sequential in the illustrated embodiments.

At 1010, a representative value is generated for each of multiple blocks of a set of frames of a video signal. The representative value is generated by applying a predetermined function to the pixels that make up the respective block and differs from representative values of particular other blocks that have different pixel values. For example, as described in connection with FIG. 5, the encoder 310 generates representative values for each of the blocks, or some subset of blocks, in frames 510 and 512. In an example, the encoder 310 generates the representative values using an equation of the form shown for equation 610 (FIG. 6), such as by using the specific example equation 612.

At 1012, a block matching operation is performed for a current block of the video signal by (i) applying the predetermined function to the pixels of the current block to generate a representative value for the current block, and (ii) interrogating representative values of a set of the blocks of the video signal in a spatial and/or temporal vicinity of the current block to identify a matching block having a representative value that matches that of the current block. For example, the encoder 310 applies equation 612, or some other equation, to the pixels of the current block to generate a representative value, H, for the current block. As shown in FIG. 5, the encoder 310 may interrogate blocks 530 and/or 532 in the spatial and/or temporal vicinity of the current block in search of a matching block. The encoder 310 may use the matching block in making intra-frame and/or inter-frame predictions.

At 1014, a pointer to a location of the matching block is sent from the electronic encoding circuitry to a decoder. The pointer provides input to the decoder to reconstruct the current block using content pointed-to by the pointer. For example, once the encoder 310 has found a matching block, the encoder 310 may generate a pointer to the matching block (e.g., any of pointers 540, 542, or 544—FIG. 5) and send the pointer to the local decoder 312*a* (FIG. 3) and/or to a remote decoder 312, e.g., on another computerized apparatus 110. The decoder 312 and/or 312*a* may then use the pointer, e.g., along with a residual block, in reconstructing the current block.

An improved technique has been described for encoding a video signal. The technique includes generating a representative value for each block of one or more video frames by applying a predetermined function to the pixels of the respective block. To perform a block matching operation for a current block, the improved technique applies the predetermined function to the current block and interrogates representative values of blocks at specified locations in a spatial and/or temporal vicinity of the current block to find a matching block whose representative value matches the one generated for the current block. Block matching can thus proceed at higher speed and with less resource consumption than can generally be achieved with prior techniques, with resulting compressed video signals having higher compression ratios and/or higher quality.

Having described certain embodiments, numerous alternative embodiments or variations can be made. For example, embodiments have been described in the context of a web conferencing application 160 that supports screen sharing. This is merely an example, however, as the function-based, block-matching encoder 310 may be used in connection with a wide range of software applications or independently of any software application. Other example use cases include multicasting, webcasting, and/or broadcasting, for example.

Also, although the examples described above are directed to real-time encoding, such as that performed in web conferencing and video chat applications, this is merely an example, as the embodiments set forth herein may also be applied in non-real-time encoding scenarios.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1050 in FIG. 10). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method operable by electronic encoding circuitry for encoding video signals, the method comprising:
   generating a representative value for each of multiple blocks of a set of frames of a video signal, the representative value generated by applying a predetermined function to the pixels that make up the respective block and differing from representative values of particular other blocks that have different pixel values;
   performing a block matching operation for a current block of the video signal by (i) applying the predetermined function to the pixels of the current block to generate a representative value for the current block, and (ii) interrogating representative values of a set of the blocks of the video signal at a set of specified locations in a spatial and temporal vicinity of the current block to identify a matching block having a representative value that matches that of the current block, the blocks whose values are interrogated in the spatial vicinity of the current block selected for interrogation based at least in part on such blocks falling within a predetermined X-Y distance of the current block and including fewer than all blocks in a current frame of the video signal; and
   sending, from the electronic encoding circuitry to a decoder, a pointer to a location of the matching block, the pointer providing input to the decoder for use in reconstructing the current block using content pointed to by the pointer,
   wherein interrogating the representative values of blocks of the video signal in the spatial and temporal vicinity of the current block includes interrogating blocks in the current frame and a set of previous frames of the video signal, wherein the method further comprises identifying the set of specified locations at which to interrogate the representative values based at least in part on detecting at least one of a displacement vector and a motion vector of at least one neighboring block of the current block, and wherein, when generating the representative value for each of the multiple blocks and for the current block, applying the predetermined function includes:
generating a transform on the pixels of the block to generate transform coefficients;
quantizing the transform coefficients to produce a set of quantized transform coefficients, each of the set of quantized transform coefficients having both a magnitude and a position relative to a set of transform results; and
applying the predetermined function to the set of quantized transform coefficients, the predetermined function accounting for both the magnitude and the position of each of the set of quantized transform coefficients.

2. The method of claim 1, wherein, upon identifying the matching block, the method further comprises verifying that the matching block is identical to the current block by comparing each pixel of the matching block with a corresponding pixel of the current block.

3. The method of claim 1, wherein each frame has a block grid, wherein the multiple blocks include a set of on-grid blocks and a set of off-grid blocks, and wherein the matching block identified when interrogating the representative values is one of the set of off-grid blocks.

4. The method of claim 3, wherein generating the representative value for each of the set of off-grid blocks is performed only after (i) generating the representative value for each of the set of on-grid blocks, (ii) interrogating representative values of each of the set of on-grid blocks in the spatial and temporal vicinity of the current block, and (iii) failing to find a matching block among the set of on-grid blocks.

5. The method of claim 1, wherein the electronic encoding circuitry is realized in a computerized apparatus, wherein the video signal includes shared screen content displayed on the computerized apparatus, and wherein the method further comprises identifying the set of specified locations at which to interrogate the representative values based at least in part on detecting a user operation performed on the computerized apparatus to navigate through the shared screen content.

6. The method of claim 1, wherein applying the predetermined function to a block accounts for both pixel values and pixel locations of pixels within the block, such that applying the predetermined function to two blocks having different pixel values and/or different orders of pixels results in two different representative values.

7. The method of claim 6, wherein the predetermined function has a form:

$$H=F(a_1,k_1)OF(a_2,k_2)O \ldots OF(a_N,k_N),$$

wherein N is the number of pixels in the block, $a_1$ to $a_N$ are respective pixel values of pixels 1 to N in the block, $k_1$ to $k_N$ are respective pixel positions of pixels 1 to N in the block, F is a sub-function that modifies each pixel value depending on its pixel position within the block, and O is an operator for combining intermediate values.

8. The method of claim 7, wherein, when generating the predetermined value, H, the method includes the electronic encoding circuitry applying an exclusive-OR operator as the operator O and a position-dependent left-bit-shift operation as the function F, wherein the position-dependent left-bit-shift operation acts to shift the pixel value $a_1$ by a number of bits greater than or equal to zero and to shift each of the pixels values $a_2$ through $a_N$ by a number of bits that is increased for each consecutive pixel value $a_2$ through $a_N$.

9. The method of claim 7, wherein each of the pixels that make up each block of the multiple blocks has multiple color channels, and wherein each of the pixel values $a_1$ to $a_N$ of pixels in each block includes color information of all color channels for the respective pixel.

10. The method of claim 9, wherein each i-th pixel in each block of the multiple blocks has three color values, $c1_i$, $c2_i$, and $c3_i$, one for each color channel, each color value represented by M bits, and wherein the electronic encoding circuitry generates a pixel value $a_i$ for each i-th pixel as $a_i=c1_i+(c2_i<<M)+(c3_i<<2M)$, where a symbol "<<" indicates a left bit shift operation by a number of bits appearing to the symbol's right.

11. The method of claim 7, wherein generating the representative value for a particular block of the multiple blocks includes:
dividing the block into regions; and
for each region, (i) generating a single row value for each row of pixels in the region by operating the predetermined function on the pixels of the respective row and (ii) generating a single region value for the region by operating the predetermined function on the row values generated for that region.

12. The method of claim 11, wherein generating the representative value for another block of the multiple blocks includes applying one of the row values generated for the particular block as one of the row values for the other block.

13. The method of claim 7, wherein generating the representative value for a particular block of the multiple blocks includes:
dividing the block into regions; and
for each region, (i) generating a single column value for each column of pixels in the region by operating the predetermined function on the pixels of the respective column and (ii) generating a single region value for the region by operating the predetermined function on the column values generated for that region.

14. The method of claim 7, wherein generating the representative value for a particular block of the multiple blocks includes:
(a) representing the block as multiple contiguous and non-overlapping arrays of pixels;
(b) generating a single first-level dyadic result for each array of pixels in the block by operating the predetermined function on the respective array of pixels, such that each array of pixels in the block is represented by a respective first-level dyadic result;
(c) representing the block as multiple contiguous and non-overlapping arrays of first-level dyadic results; and
(d) generating a single second-level dyadic result for each array of first-level dyadic results in the block by operating the predetermined function on the respective array of first-level dyadic results, each array of first-level dyadic results thereby being represented by a respective second-level dyadic result.

15. The method of claim 14, wherein generating the representative value for the particular block further includes repeating steps (c) and (d) in a like manner for at least one additional level until a single value is produced by dyadic computation that provides the representative value for the block.

16. The method of claim 15, wherein generating the representative value for another block of the multiple blocks includes applying any of the first-level dyadic results, second-level dyadic results, or any additional-level dyadic results generated for the particular block as a first-level dyadic result, second-level dyadic result, or additional-level dyadic result for the other block.

17. An apparatus for encoding video signals, the apparatus comprising electronic encoding circuitry constructed and arranged to:
   generate a representative value for each of multiple blocks of a set of frames of a video signal, the representative value generated by applying a predetermined function to the pixels that make up the respective block and differing from representative values of particular other blocks that have different pixel values;
   perform a block matching operation for a current block of the video signal by (i) applying the predetermined function to the pixels of the current block to generate a representative value for the current block, and (ii) interrogating representative values of a set of the blocks of the video signal at a set of specified locations in a spatial and/or temporal vicinity of the current block to identify a matching block having a representative value that matches that of the current block; and
   send, from the electronic encoding circuitry to a decoder, a pointer to a location of the matching block, the pointer providing input to the decoder for use in reconstructing the current block using content pointed to by the pointer,
   wherein the electronic encoding circuitry is realized in a computerized apparatus, wherein the video signal includes shared screen content displayed on the computerized apparatus, and wherein the electronic encoding circuitry is further constructed and arranged to identify the set of specified locations at which to interrogate the representative values for block matches based at least in part on (i) detecting a user operation performed on the computerized apparatus to pan or scroll through the shared screen content and (ii) biasing locations of blocks to interrogate according to movement of the shared screen content induced by the user operation, and
   wherein, when constructed and arranged to generate the representative value for each of the multiple blocks and for the current block, the electronic encoding circuitry is further constructed and arranged to apply the predetermined function to:
      generate a transform on the pixels of the block to generate transform coefficients;
      quantize the transform coefficients to produce a set of quantized transform coefficients, each of the set of quantized transform coefficients having both a magnitude and a position relative to a set of transform results; and
      apply the predetermined function to the set of quantized transform coefficients, the predetermined function accounting for both the magnitude and the position of each of the set of quantized transform coefficients.

18. A non-transitory, computer-readable medium including instructions which, when executed by electronic encoding circuitry, cause the electronic encoding circuitry to perform a method of encoding video signals, the method comprising:
   generating a representative value for each of multiple blocks of a set of frames of a video signal, the representative value generated by applying a predetermined function to the pixels that make up the respective block and differing from representative values of particular other blocks that have different pixel values;
   performing a block matching operation for a current block of the video signal by (i) applying the predetermined function to the pixels of the current block to generate a representative value for the current block, and (ii) interrogating representative values of a set of the blocks of the video signal at a set of specified locations in a spatial and/or temporal vicinity of the current block to identify a matching block having a representative value that matches that of the current block; and
   sending, from the electronic encoding circuitry to a decoder, a pointer to a location of the matching block, the pointer providing input to the decoder for use in reconstructing the current block using content pointed to by the pointer,
   wherein applying the predetermined function to a block accounts for both pixel values and pixel locations of pixels within the block, such that applying the predetermined function to two blocks having identical pixel values but in different pixel orders results in two different representative values, and
   wherein, when generating the representative value for each of the multiple blocks and for the current block, applying the predetermined function includes:
      generating a transform on the pixels of the block to generate transform coefficients;
      quantizing the transform coefficients to produce a set of quantized transform coefficients, each of the set of quantized transform coefficients having both a magnitude and a position relative to a set of transform results; and
      applying the predetermined function to the set of quantized transform coefficients, the predetermined function accounting for both the magnitude and the position of each of the set of quantized transform coefficients.

* * * * *